United States Patent [19]

Shaw et al.

[11] Patent Number: 5,366,740
[45] Date of Patent: Nov. 22, 1994

[54] CHEWING GUM CONTAINING WHEAT GLUTEN

[75] Inventors: James J. Shaw, Morristown; Lucy L. Wong, Lake Hiawatha; Allan H. Graff, Randolph; Hector Olaya, Parsippany; Shirley A. Barcelon, Randolph; Marc Degady, Morris Plains; Charles J. Brine, Princeton, all of N.J.

[73] Assignee: Warner-Lambert Company, Morris Plains, N.J.

[21] Appl. No.: 13,595

[22] Filed: Feb. 4, 1993

[51] Int. Cl.⁵ .................................. A23G 3/30
[52] U.S. Cl. .......................... 426/3; 426/656
[58] Field of Search ......................... 426/3–6, 426/656, 657

[56] References Cited

U.S. PATENT DOCUMENTS

| | | | |
|---|---|---|---|
| 1,700,387 | 1/1929 | Stetson | 426/3 |
| 2,461,829 | 2/1949 | Lowen | 426/3 |
| 2,469,861 | 5/1949 | Cohoe | 426/3 |
| 2,586,675 | 2/1952 | Lutz | 426/3 |
| 3,409,440 | 11/1968 | Höhl | 426/3 |
| 3,814,815 | 6/1974 | Hashimoto | 426/3 |
| 3,826,847 | 7/1974 | Ogawa et al. | 426/3 |

FOREIGN PATENT DOCUMENTS

| | | |
|---|---|---|
| 52-096771 | 8/1977 | Japan . |
| 52-120168 | 10/1977 | Japan . |
| 54-044071 | 4/1979 | Japan . |
| 58-094350 | 6/1983 | Japan . |
| 59-055148 | 3/1984 | Japan . |

*Primary Examiner*—Jeanette Hunter
*Attorney, Agent, or Firm*—Linda A. Vag

[57] ABSTRACT

A digestible, biodegradable chewing gum comprising wheat gluten and a texturizing agent such as calcium carbonate, rice flour or ascorbic acid. The chewing gum can be swallowed and digested, or it can be discarded in ordinary compost waste facilities.

6 Claims, No Drawings

CHEWING GUM CONTAINING WHEAT GLUTEN

BACKGROUND OF THE INVENTION

1. Field of the Invention

This invention is directed to chewing gum compositions comprising wheat gluten and to methods for manufacturing such compositions.

2. Description of Related Art

Conventional chewing gums have achieved broad success in the marketplace. Such chewing gums typically comprise gum base and other components that provide pleasant chewing characteristics. Unfortunately, conventional chewing gums have several drawbacks. Conventional chewing gum bases are not "biodegradable," or digestible, and disposal of conventional chewing gums can cause unsightly litter.

Gluten has been tried as a digestible and biodegradable alternative to conventional chewing gum base. U.S. Pat. No. 3,814,815 to Hashimoto et al., issued on Jun. 4, 1974, for example, is directed to the use of a gum base of gluten denatured more than 10%.

Another attempt to use gluten as a gum base, U.S. Pat. No. 2,469,861 to Cohoe, issued May 10, 1949, is directed to a chewing gum base comprising a combination of zein and wheat gluten. U.S. Pat. No. 2,586,675 to Lutz, issued Feb. 19, 1952, is also directed to an edible chewing gum composition comprising wheat gluten.

Japanese Patent No. 52,096,771, published Aug. 13, 1977, is directed to using freeze-dried wheat gluten in chewing gum. Japanese Patent No. 54,044,071, published Apr. 7, 1979, is directed to a wheat gluten chewing gum base made by cross-linking wheat gluten with a protein, polysaccharides, saccharides and oligiosaccharides, such as starch, mannan, agar, gum arabic, curdlan, and dextran. The cross-linking is carried out by application of microwaves and is done in the presence of water.

Japanese Patent No. 52,120,168, published Oct. 8, 1977, is directed to a chewing gum-like food containing 5–50% fibrous milk protein, 5–30% non-edible chewing gum base, 50–95% edible nougat (or both), sweetener and flavoring.

Wheat gluten has also been used an a oil absorbing agent in a conventional, chocolate, chewing gum in Japanese Patent No. 59,055,148, published Mar. 30, 1984, and gluten has been used as a pigment retention agent in conventional chewing gum in Japanese Patent No. 58,094,350, published Jun. 4, 1983.

Gluten has also found use in a variety of fields. U.S. Pat. No. 3,409,440 to Hobl, issued Nov. 5, 1968 is directed to a heat stable wheat protein suspension by bringing denatured wheat gluten into an aqueous suspension and establishing a pH of 3.7 to 4.9 by the addition of a food acid, for use in bakery goods. U.S. Pat. No. 2,461,829 to Lowen is directed to the use of wheat gluten in medicinal capsules.

Despite the use of gluten in other fields, gluten's use in the chewing gum field has been hampered by a number of organoleptic factors, and no gluten based chewing gum has gained wide acceptance in the American market, regardless of the advantages of a degradable, edible chewing gum.

SUMMARY OF THE INVENTION

It is an object of the invention to provide a digestible, degradable, gluten-based chewing gum having acceptable flavor, sweetness and organoleptic qualities.

It is also an object of the invention to provide unique texturizing agents for a protein and carbohydrate based chewing gum.

It is another object of the invention to provide a method for making a chewing gum from digestible and degradable materials.

Additional objects and advantages of the invention will be apparent in part from the following description of the invention.

To achieve the objects of the invention, as broadly sen out herein, the invention comprises a long-chewing composition prepared from hydrated grain protein and other ingredients to mimic the texture and chew properties of chewing gum. Gluten, particularly wheat gluten, is elastic and long chewing, but it is difficult to hydrate uniformly, is prone to clumping and has a blubbery texture that makes it unsatisfactory as a chewing gum ingredient. The chew texture of gluten is softened by the addition of calcium carbonate or glutinous rice flour to wheat gluten. Whey protein, rice protein concentrate and polydextrose or glycols such as glycerin and propylene glycol, may also be used. Other suitable softening agents include ascorbic acid and other ingredients commonly used as dough conditioners or that enter into redox reactions with wheat gluten.

The invention also provides controlled flavor release over an extended duration. As a result, a lower level of flavor may be used compared to conventional chewing gums.

DESCRIPTION OF PREFERRED EMBODIMENTS

The presently preferred embodiments of the invention will now be set forth.

The invention comprises gluten as a substantial portion of the chewing gum base. Preferably, the gluten is wheat gluten, and most preferably the wheat gluten is vital wheat gluten or some other nondenatured wheat gluten. The gluten may comprise from about 15% to about 75% by weight of the final composition, preferably from about 20% to about 65% by weight, and most preferably from about 30% to about 55% by weight. Higher amounts of gluten will make the chewing gum composition unacceptably tough, due to not enough water being present in the composition to hydrate the matrix formed by the gluten, and too little gluten will prevent the chewing gum from forming an adequate matrix to make a chewing gum bolus.

A blend of spray dried and flash dried wheat glutens combine to produce a texture which more closely mimics that of chewing gum than does either gluten type alone. The spray dried gluten is chemically treated to permit the atomization required for spray drying.

Increasing the ratio of flash dried to spray dried gluten increases the piece hardness and chew texture. Higher levels of spray dried gluten produce a smoother, more evenly hydrated product. The particular ratio desired depends upon other formulation ingredient levels, notably those of water, glycerin and the texture modifiers outlined below.

Hydrated wheat gluten forms an elastic bonding network that can be used as a chewing gum. Gluten alone, however, does not provide an organoleptically acceptable chewing gum. It is prone to crumbling and is difficult to hydrate uniformly to form an acceptable chewing gum bolus in the mouth.

Chewing gum compositions of the invention typically include water as an ingredient. Water may comprise from about 10% to about 40% by weight of the chewing gum composition, preferably from about 15% to about 30%, and most preferably from about 20% to about 25%.

In order to overcome the limitations of using gluten alone as a gum base, the chewing gum of the invention may additionally comprise a texturizing agent. The texturizing agent should be degradable and edible like wheat gluten, and should act to modify the elastic bonding network of the gluten without disrupting the matrix and assist in uniform hydration of the gluten.

Calcium carbonate is a preferred texture modifier. Other salts such as dicalcium phosphate, tricalcium phosphate, magnesium stearate and the like are also appropriate. Preferably, the calcium carbonate comprises from about 3 to about 20% by weight of the chewing gum composition, more preferably from about 3 to about 10% and most preferably from about 5 to about 8%.

Certain carbohydrates have proven to be acceptable texturizing agents. One such agent is glutinous rice flour, a mixture of carbohydrates and proteins. Preferably, the rice flour comprises from about 5% to about 20% by weight of the chewing gum composition, more preferably from about 6% to about 18%, and most preferably from about 7% to about 15%. The most preferred level is 9.2%. The addition of rice flour improves the texture of the chewing gum. Other grain flours, such as bread flour and corn starch, that improve the texture of the chewing gum can also be used. Some other flours, however, can make the gluten matrix disintegrate.

Polydextrose may also act as a texturizing agent for gluten-based chewing gums. Glucose, sucrose and polyols such as sorbitol or mannitol, however, are not acceptable at levels used in conventional chewing gums. Preferably, the polydextrose may comprise from about 5% to about 20% by weight of the chewing gum composition, more preferably from about 6% to about 18%, and most preferably from about 7% to about 15%.

Certain commercially available proteins may also be used as texturizing agents. Whey protein and rice protein concentrates are especially preferred for use as texturizing agents. Not all proteins, however, are useful as texturizing agents. Soy proteins and pea proteins cause the gluten network to disintegrate. Preferably the texturizing protein should comprise from about 5% to about 20% by weight of the chewing gum composition, more preferably from about 6% to about 18%, and most preferably from about 7% to about 15%.

When used together, the texturizing protein and the texturizing carbohydrate should comprise from about 5% to about 20% by weight of the chewing gum composition, more preferably from about 6% to about 18%, and most preferably from about 7% to about 15%.

Another texturizing agent that may be used in conjunction with the texturizing agents discussed above is ascorbic acid. Ascorbic acid produces a less lumpy, noticeably smoother texture to the chewing gum. Preferably the ascorbic acid should comprise up to about 1% of the chewing gum, by weight. Other ingredients commonly used as dough conditioners or ingredients that enter into oxidation-reduction (redox) reactions with wheat gluten may also be used.

Acidulants may also be added to the chewing gum in limited amounts. Acidulants include, but are not limited to, edible acids typically used in food products for flavor. Preferred acids include acetic, citric and lactic acid.

Flavors and intense sweeteners may also be added in appropriate amounts. One advantage of the invention is that flavors and sweeteners are more fully and more evenly released by the chewing gum of the invention than is the case with conventional chewing gums. Flavors and intense sweeteners may comprise up to about 1% by weight of the chewing gum.

Other agents may be added to the chewing gum to bring about various refinements in the organoleptic or processing qualities of the chewing gum. Hydrocolloids, such as agar, acacia, guar, carrageenan, pectin and alginates; amino acids, such as cysteine and protein hydrolysates; processing aids such as magnesium stearate and microcrystalline cellulose; antimicrobial agents, such as sorbates, benzoates and propionates; antioxidants such as BHA and BHT; acidulants such as citric acid; colors and dyes, such as carotenoids, certified dyes and lakes and natural color; celluloses, such as cellulose gum; processing agents, such as chelating agents, dough conditioners and release agents; emulsifiers, such as acetylated monoglycerides, glycerol esters and lecithin; enzymes, such as amylases, cellulases and proteases; grains and flours such as wheat, rice, barley, buckwheat and pea; proteins such as lactalbumin, ovalbumin, and milk solids; carbohydrates, such as maltodextrins, dextrins and hydrogenated starch hydrolysates; bulk fillers such as dietary fiber, yeast cell walls; calcium carbonate, talc, dicalcium phosphate and the like; humectants such as glycerin, sorbitol, propylene glycol, 1-3 hexylene glycol and triacetin; starches such as corn, wheat and modified starches; fruits, dried fruits and fruit concentrates; and zein and other film forming agents such as carboxymethyl cellulose.

The method for preparing the chewing gum of the invention begins with blending wheat gluten and texturizing agents such as calcium carbonate or glutinous rice flour along with other ingredients such as potassium sorbate, sweetener and flavors. Any conventional blending process can be used, but dry blending is preferred. Liquids, such as flavor oils, may be dispersed onto the blend of dry powders.

The flavored blend is then placed in a mixing kettle, and glycerin, ascorbic acid and water are added in the mixer.

In alternative embodiments, the liquid components, including the glycerin and water, may be added to the powder in a low-shear mixer, such as a planetary mixer, and then the mixing may be completed in a higher-shear mixer. Or, the dry-blend powder may be combined with the liquids in a low-shear mixer, and the resulting mixture may be extruded through an extruder, preferably a twin screw extruder, with sufficient energy or shear to form the gluten bonding network. A continuous extrusion process, in which the dry powders and liquids are metered into and mixed in an extruder barrel, is another acceptable method for preparing the chewing gum of the invention.

The different techniques set out above for making the inventive chewing gum affect the extent of gluten bonding. The site of water and glycerin introduction and the amount of shear or heat given to the product affect the amount of gluten bonding, which in turn affects the organoleptic qualities of the chewing gum. Too much shear or heat will destroy the matrix, while not enough will give a lumpy texture. One advantage of the addition of the ingredients directly to the extruder is that gluten bonding and piece formation may take place simultaneously.

The following examples will demonstrate some aspects of the invention, but they should not be considered as limiting the scope or spirit of the invention.

EXAMPLE 1

The following ingredients were combined in a mixing kettle and blended until a uniform product was obtained:

| Ingredient | Weight Percent |
| --- | --- |
| Wheat Gluten | 37.48% |
| Rice Flour | 4.70% |
| Unmodified Corn Starch | 4.69% |
| Calcium Carbonate | 3.00% |
| Titanium Dioxide | 0.50% |
| Potassium Acesulfame (ACE-K) | 0.28% |
| Potassium Sorbate | 0.30% |
| Pepperint Flavor | 0.55% |
| Ascorbic Acid | 0.50% |
| Glycerin | 33.00% |
| Water | 15.00% |
| Total | 100.00% |

The kettle was operated at room temperature and blending took from 5 to 10 minutes. The product has a soft, desirable texture and a pleasing taste.

EXAMPLES 2–3

The composition of Example 1 was prepared by using a low shear "dough" and strengthening the bonding matrix by shear extrusion. The composition of Example 1 was also prepared by adding the liquid ingredients (along with ascorbic acid) to the blended dry ingredients through different ports in a mixing extruder.

EXAMPLES 4–6

The effect of calcium carbonate was evaluated by preparing the following compositions using the method of Example 1.

| Ingredient | Example 4 Wt. Percent | Example 5 Wt. Percent | Example 6 Wt. Percent |
| --- | --- | --- | --- |
| Wheat Gluten | 31.67% | 33.67% | 29.67% |
| Rice Flour | 14.70% | 14.70% | — |
| Bread Flour | — | — | 14.70% |
| Calcium-Carbonate | 3.00% | 1.00% | 5.00% |
| Ace-K | 0.28% | 0.28% | 0.28% |
| Potassium-Sorbate | 0.30% | 0.30% | 0.30% |
| Flavor | 0.55% | 0.55% | 0.55% |
| Ascorbic Acid | 0.50% | 0.50% | 0.50% |
| Glycerin | 33.00% | 33.00% | 33.00% |
| Water | 16.00% | 16.00% | 16.00% |
| Total: | 100.00% | 100.00% | 100.00% |

The chewing gum containing 3.00% Calcium Carbonate was preferred, although the other chewing gums were satisfactory.

EXAMPLES 7–8

Dicalcium phosphate is a salt often used in chewing gum. A comparative test was made to determine whether this salt was preferable to Calcium Carbonate at 5.00% levels in the chewing gum of the invention. The following compositions were prepared using the method of Example 1.

| Ingredient | Example 7 Wt. Percent | Example 8 Wt. Percent |
| --- | --- | --- |
| Wheat Gluten | 30.87% | 30.87% |
| Rice/whey-protein blend | 13.50% | 13.50% |
| Calcium-Carbonate | 5.00% | — |
| Dicalcium-phosphate | — | 5.00% |
| Ace-K | 0.28% | 0.28% |
| Potassium-Sorbate | 0.30% | 0.30% |
| Flavor | 0.55% | 0.55% |
| Ascorbic Acid | 0.50% | 0.50% |
| Glycerin | 33.00% | 33.00% |
| Water | 16.00% | 16.00% |
| Totals: | 100.00% | 100.00% |

Although both calcium carbonate and dicalcium phosphate provided functional chewing gums, the calcium carbonate-containing chewing gum had better characteristics.

EXAMPLES 9–11

Ascorbic acid proved to be a suitable texture modifier for wheat gluten and produced a smoother, more consistent texture. Three chewing gum compositions were prepared as in Example 1.

| Ingredient | Example 9 Wt. Percent | Example 10 Wt. Percent | Example 11 Wt. Percent |
| --- | --- | --- | --- |
| Wheat Gluten | 34.67% | 34.92% | 34.42% |
| Rice/milk-protein blend | 15.00% | 15.00% | 15.00% |
| Ace-K | 0.28% | 0.28% | 0.28% |
| Flavor | 0.55% | 0.55% | 0.55% |
| Ascorbic Acid | 0.50% | 0.25% | 0.75% |
| Glycerin | 33.00% | 33.00% | 33.00% |
| Water | 16.00% | 16.00% | 16.00% |
| Totals: | 100.00% | 100.00% | 100.00% |

Of these formulations, 0.5% ascorbic acid was preferable to 0.25% and 0.75%. At higher levels, such as 1.5% to 4%, the taste of the product was not as good as at lower levels. The observed effect of ascorbic acid was not as an acidulant alone, because a comparative example made with 0.5% citric acid did not provide the same texturizing benefit as ascorbic acid.

EXAMPLES 12–17

Sugar or sugar alcohols are used in chewing gum for bulk sweetness and to soften the gum base. These carbohydrates are typically used at between 50 and 75% by weight of the chewing gum. In order to test the compatibility of sugar and sugar alcohols with the invention, the following compositions were prepared using the method of Example 1.

| Ingredient | Example 12 Wt. Percent | Example 13 Wt. Percent | Example 14 Wt. Percent |
| --- | --- | --- | --- |
| Wheat Gluten | 30.87% | 27.40% | 23.90% |
| Rice/whey-protein blend | 13.50% | 11.97% | 10.47% |
| Mannitol | 5.00% | 10.00% | 15.00% |
| Ace-K | 0.28% | 0.28% | 0.28% |

-continued

| Ingredient | Example 12 Wt. Percent | Example 13 Wt. Percent | Example 14 Wt. Percent |
|---|---|---|---|
| Potassium Sorbate | 0.30% | 0.30% | 0.30% |
| Flavor | 0.55% | 0.55% | 0.55% |
| Ascorbic Acid | 0.50% | 0.50% | 0.50% |
| Glycerin | 33.00% | 33.00% | 33.00% |
| Water | 16.00% | 16.00% | 16.00% |
| Totals: | 100.00% | 100.00% | 100.00% |

| Ingredient | Example 15 Wt. Percent | Example 16 Wt. Percent | Example 17 Wt. Percent |
|---|---|---|---|
| Wheat Gluten | 30.87% | 27.40% | 23.90% |
| Rice/whey-protein blend | 13.50% | 11.97% | 10.47% |
| Sucrose | 5.00% | 10.00% | 15.00% |
| Ace-K | 0.28% | 0.28% | 0.28% |
| Potassium Sorbate | 0.30% | 0.30% | 0.30% |
| Flavor | 0.55% | 0.55% | 0.55% |
| Ascorbic Acid | 0.50% | 0.50% | 0.50% |
| Glycerin | 33.00% | 33.00% | 33.00% |
| Water | 16.00% | 16.00% | 16.00% |
| Totals: | 100.00% | 100.00% | 100.00% |

The texture of the inventive composition was compatible only with lower levels (e.g., 5%) of sugar and sugar alcohols. At these levels the added sweetness from the sugar or sugar alcohol was not significant.

EXAMPLES 18-20

Sugars and sugar alcohols likely interrupt the gluten matrix by more strongly bolding the available water at the expense of the proteins in gluten. This competition for water is strongly influenced by the difference in molecular weight between sugars and proteins. A higher molecular weight carbohydrate would be expected to have better performance. Polydextrose was tested as a texturizing agent by adding it as an ingredient in the following examples made by the process of Example 1.

| Ingredient | Example 18 Wt. Percent | Example 19 Wt. Percent | Example 20 Wt. Percent |
|---|---|---|---|
| Wheat Gluten | 30.87% | 27.40% | 23.90% |
| Rice/whey-protein blend | 13.50% | 11.97% | 10.47% |
| Polydextrose | 5.00% | 10.00% | 15.00% |
| Ace-K | 0.28% | 0.28% | 0.28% |
| Potassium Sorbate | 0.30% | 0.30% | 0.30% |
| Flavor | 0.55% | 0.55% | 0.55% |
| Ascorbic Acid | 0.50% | 0.50% | 0.50% |
| Glycerin | 33.00% | 33.00% | 33.00% |
| Water | 16.00% | 16.00% | 16.00% |

-continued

| Ingredient | Example 18 Wt. Percent | Example 19 Wt. Percent | Example 20 Wt. Percent |
|---|---|---|---|
| Totals: | 100.00% | 100.00% | 100.00% |

Polydextrose proved to have acceptable performance over the tested range.

EXAMPLES 21-22

Glycerin was compared to sorbitol as a humectant. The following compositions were prepared by the method of Example 1.

| Ingredient | Example 21 Wt. Percent | Example 22 Wt. Percent |
|---|---|---|
| Wheat Gluten | 44.00% | 45.15% |
| Whey protein | 9.65% | 10.00% |
| Ace-K | 0.28% | 0.28% |
| Flavor | 0.55% | 0.55% |
| Glycerin | 28.02% | 14.01% |
| Sorbitol Solution (70%) | — | 19.01% |
| Water | 17.50% | 11.00% |
| Totals: | 100.00% | 100.00% |

Glycerin was found to be the preferred humectant. In Example 22, the gluten matrix was destroyed.

EXAMPLES 23-25

Various proteins were tested as texture modifiers for wheat gluten. The following compositions were prepared in accordance with the procedure set out in Example 1.

| Ingredient | Example 23 Wt. Percent | Example 24 Wt. Percent | Example 25 Wt. Percent |
|---|---|---|---|
| Wheat Gluten | 45.45% | 40.45% | 38.65% |
| Whey protein | 10.00% | 10.00% | 10.00% |
| Soy protein | — | 5.00% | — |
| Pea protein isolate | — | — | 5.00% |
| Ace-K | 0.28% | 0.28% | 0.28% |
| Flavor | 0.55% | 0.55% | 0.55% |
| Glycerin | 28.02% | 28.02% | 28.02% |
| Water | 15.70% | 15.70% | 17.50% |
| Totals: | 100.00% | 100.00% | 100.00% |

The presence of pea protein or soy protein as a partial replacement for whey protein destroyed the matrix.

It will be apparent to those skilled in the art that various modifications can be made to the formulations set out above.

EXAMPLES 26-30

Higher water activity systems were investigated. The following compositions were prepared in accordance with the procedure set out in Example 1.

| Ingredient | Example 26 Wt. Percent | Example 27 Wt. Percent | Example 28 Wt. Percent | Example 29 Wt. Percent | Example 30 Wt. Percent |
|---|---|---|---|---|---|
| Wheat Gluten | 57.12% | 49.12% | 49.12% | 54.12% | 51.37% |
| Calcium Carbonate | 10.00% | 8.00% | 8.00% | 3.00% | 3.00% |
| Potassium Sorbate | 0.30% | 0.30% | 0.30% | 0.30% | 0.30% |
| Ace-K | 0.35% | 0.35% | 0.35% | 0.35% | 0.35% |
| Peppermint Flavor | 1.20% | 1.20% | 1.20% | 1.20% | 1.20% |
| Titanium Dioxide | 0.50% | 0.50% | 0.50% | 0.50% | 0.50% |
| Ascorbic Acid | 0.50% | 0.50% | 0.50% | 0.50% | 0.50% |
| Water | 30.00% | 25.00% | 20.00% | 20.00% | 16.00% |

| Ingredient | Example 26 Wt. Percent | Example 27 Wt. Percent | Example 28 Wt. Percent | Example 29 Wt. Percent | Example 30 Wt. Percent |
|---|---|---|---|---|---|
| Glycerin | — | 15.00% | 20.00% | 20.00% | 26.75% |
| Totals: | 100.00% | 100.00% | 100.00% | 100.00% | 100.00% |

In general, tighter, tougher and more chewy textures resulted, with higher water activity, but higher water activity systems require microbiological control and stabilization.

What is claimed is:

1. A chewing gum base composition comprising:
   (a) wheat gluten; and
   (b) a texturizing agent selected from the group consisting of rice flour, corn starch, polydextrose and calcium carbonate.

2. The chewing gum of claim 1 wherein said wheat gluten is vital wheat gluten.

3. The chewing gum of claims 1 or 2 further comprising an additional texturizing agent selected from the group consisting of whey proteins, rice proteins and ascorbic acid.

4. A chewing gum base composition comprising:
   (a) wheat gluten; and
   (b) a protein-based texturizing agent selected from the group consisting of whey proteins and rice proteins.

5. The chewing gum of claim 4 wherein said wheat gluten is vital wheat gluten.

6. The chewing gum of claims 4 or 5 further comprising ascorbic acid.

* * * * *